United States Patent
Fong et al.

(10) Patent No.: US 11,831,237 B2
(45) Date of Patent: Nov. 28, 2023

(54) POWER SUPPLY WITH POWER FACTOR CORRECTION BYPASS

(71) Applicant: Microsoft Technology Licensing, LLC, Redmond, WA (US)

(72) Inventors: Chee Kiong Fong, Saratoga, CA (US); Michael Roy Volkman, Seattle, WA (US); Geoffrey Jason Shew, Redmond, WA (US); Suet Fong Tin, Redmond, WA (US); Marshall T Depue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/656,184

(22) Filed: Mar. 23, 2022

(65) Prior Publication Data

US 2023/0188031 A1 Jun. 15, 2023

Related U.S. Application Data

(60) Provisional application No. 63/287,918, filed on Dec. 9, 2021.

(51) Int. Cl.
*H02M 1/10* (2006.01)
*H02M 1/42* (2007.01)
*H02M 1/12* (2006.01)

(52) U.S. Cl.
CPC .......... *H02M 1/4208* (2013.01); *H02M 1/12* (2013.01)

(58) Field of Classification Search
CPC ............. H02M 1/4266; H02M 1/4208; H02M 1/4225; H02M 1/00; H02M 1/12; H02M 1/10; H02M 1/42
See application file for complete search history.

(56) References Cited

U.S. PATENT DOCUMENTS

| | | | |
|---|---|---|---|
| 9,401,635 B2 | 7/2016 | Humphrey et al. | |
| 9,451,663 B2 | 9/2016 | Jang et al. | |

(Continued)

FOREIGN PATENT DOCUMENTS

| | | |
|---|---|---|
| CN | 201690360 U | 12/2010 |
| WO | 2016042521 A1 | 3/2016 |
| WO | 2021126246 A1 | 6/2021 |

OTHER PUBLICATIONS

"Sanken—Selection Guide", Retrieved from: https://www.semicon.sankenele.co.jp/common/pdf/selectionguide/sge0001.pdf, Jan. 26, 2021, 48 Pages.

(Continued)

*Primary Examiner* — Adolf D Berhane
(74) *Attorney, Agent, or Firm* — Alleman Hall Creasman & Tuttle LLP

(57) ABSTRACT

A power supply includes a power factor correction (PFC) circuit, a PFC bypass circuit, and a decision circuit. The PFC circuit is configured to receive an input current from a power source and, when enabled, reduce current harmonics in the input current by shaping an input sinusoidal current waveform to match a phase and shape of a sinusoidal input voltage waveform. The PFC bypass circuit is configured to bypass the PFC circuit when the PFC circuit is disabled. The decision circuit includes a detection circuit configured to detect an output load of the power supply and is configured to output a PFC enable command based at least in part on the detected output load being greater than or equal to a threshold value and a determination that an input voltage of the power source is greater than or equal to a threshold value.

20 Claims, 10 Drawing Sheets

(56) References Cited

U.S. PATENT DOCUMENTS

| | | |
|---|---|---|
| 11,183,870 B2 | 11/2021 | Lin et al. |
| 11,303,195 B2 * | 4/2022 | Chung .............. H02M 3/33592 |
| 11,522,442 B1 * | 12/2022 | Li ...................... H02M 1/0032 |
| 2012/0026763 A1 | 2/2012 | Humphrey et al. |
| 2015/0280593 A1 * | 10/2015 | Ando ...................... H02M 1/42 |
| | | 363/17 |
| 2017/0317599 A1 * | 11/2017 | Satoh .................. H02M 1/4208 |
| 2018/0219474 A1 * | 8/2018 | Greetham ............... H02M 1/12 |
| 2023/0076369 A1 * | 3/2023 | Zhou ................... H02M 1/4216 |

OTHER PUBLICATIONS

ISA European Patent Office, International Search Report and Written Opinion Issued in PCT Application No. PCT/US22/043166, dated Dec. 8, 2022, 11 Pages.

Walne, M., "Power Factor Correction: Passive Versus Active", In Journal of Electronic Engineering, vol. 70, Issue 855, Mar. 1998, 2 Pages.

Wolfle W., et al., "Quasi-Active Power Factor Correction with A Variable Inductive Filter: Theory, Design and Practice", In Journal of IEEE Transactions on Power Electronics, vol. 18, Issue 1, Jan. 2003, pp. 248-255.

Morrison, David, "PFC/PWM Controller Disables PFC to Limit Standby Power", Retrieved from: https://www.electronicdesign.com/content/article/21188287/pfcpwm-controller-disables-pfc-to-limit-standby-power, Aug. 1, 2005, 2 Pages.

\* cited by examiner

POWER SUPPLY WITH POWER FACTOR CORRECTION BYPASS

CROSS REFERENCE TO RELATED APPLICATIONS

This application claims priority to U.S. Provisional Patent Application No. 63/287,918, filed Dec. 9, 2021, the entirety of which is hereby incorporated herein by reference for all purposes.

BACKGROUND

A power supply takes electrical power from a power source such as a mains power delivered to an outlet, and converts it into an output having the appropriate current and voltage for its intended use. A linear power supply steps up or down the voltage to supply a constant, higher, or lower output voltage. A switching-mode power supply can step up or down the voltage of its output and is typically more efficient and smaller in size.

SUMMARY

A power supply is provided herein. The power supply may include a power factor correction (PFC) circuit configured to receive an input current from a power source and, when enabled, reduce current harmonics in the input current by shaping an input sinusoidal current waveform to match a phase and shape of a sinusoidal input voltage waveform. The power supply may further include a PFC bypass circuit configured to bypass the PFC circuit when the PFC circuit is disabled. The power supply may further include a detection circuit configured to detect an output load of the power supply and output a PFC enable command based at least in part on the detected output load being greater than or equal to a threshold value and a determination that an input voltage of the power source is greater than or equal to a threshold value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
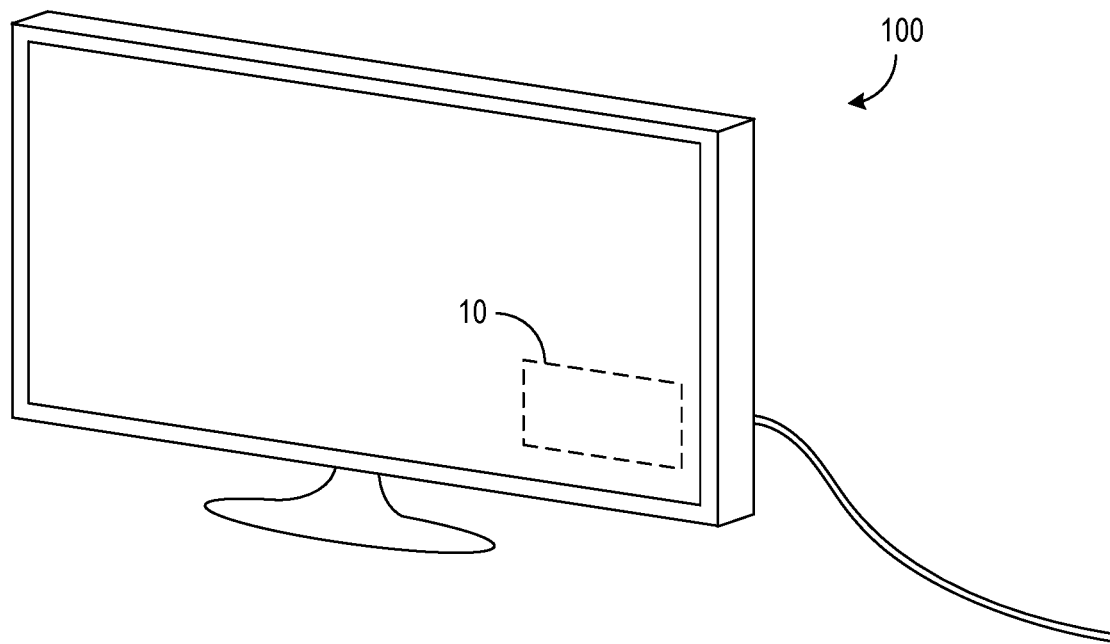
FIGS. 1A-1B show illustrations of example computing devices equipped with a power supply according to the present disclosure.

As discussed above, both linear and switching power supplies are known. A switching power supply creates more noise than a linear power supply. Either type may spend significant time in low to medium power scenarios, such as when an associated electronic device is in an idle or standby mode. In order for a given power supply to be capable of supplying the maximum power load demanded by an associated electronic device, larger capacity components are used and therefore inefficiencies can be created during low to medium power scenarios. In addition, non-linear loads, such as those produced by a primary bulk capacitor typically found in power supplies, generate a harmonic current in the input current. This harmonic current causes higher circulating currents on the AC lines and generate heat. This can cause unreliability and transmission losses in distribution over the electrical network; is destructive to the network infrastructure delivering the mains power, such as transformers and cables; and also can trip circuit breakers locally, causing a disruption in service. Worldwide, some regulatory bodies limit the allowable harmonics a device may induce in the mains power to keep the electrical network stable and prevent a reduction in equipment lifespan. If current harmonics are not limited, electric utilities need equipment to be heavier duty in order to absorb internal energy requirements, causing increased operating costs. One way to meet regulated limits is by power factor correction (PFC). The power factor is the ratio of the real power to the apparent power of a circuit, and ranges from 0 to 1. A reactive power, which can be positive or negative depending on whether the load is inductive or capacitive, indicates that the circuit is generating power which is returned to the power source, such as is the case with induced harmonic current in the input current. A power factor of 1 is perfectly efficient for transmission of energy if the total load is met with power factor of 1. PFC can be used to increase the power factor to bring it closer to 1, and reduce or eliminate the harmonic current. It will be appreciated that if the total load is inductive and a power supply is pulling a capacitive load, even with very low PFC, the power supply will help the transmission to be more efficient. Furthermore, when the power supply is outputting power to service a low load, the total loss (both fixed and variable) of a PFC circuit is higher than the transmission loss, so turning off the PFC circuit is more efficient in low load conditions.

However, the addition of all of the components in the PFC circuit further reduces the efficiency of the power supply. The efficiency of an example 90 W power supply was tested with and without PFC enabled, and the results are graphed for a range of between 10 W and 70 W in FIG. 9. Between the output load levels of 20 W and 70 W, disabling the PFC led to an average efficiency savings of more than 2%. While this savings may seem modest on its face, even a 2-3% increase in efficiency, depending on the specific configuration of the power supply, can result in significant energy savings and greenhouse gas reductions, particularly when the power supplies in question are used for electronic devices that spend much of their time dormant. For example, a 2-3% increase in efficiency in all power supplies used even by one line of computing devices worldwide could result in a reduction of millions of metric tons of $CO_2$ per year.

Figure 1B:
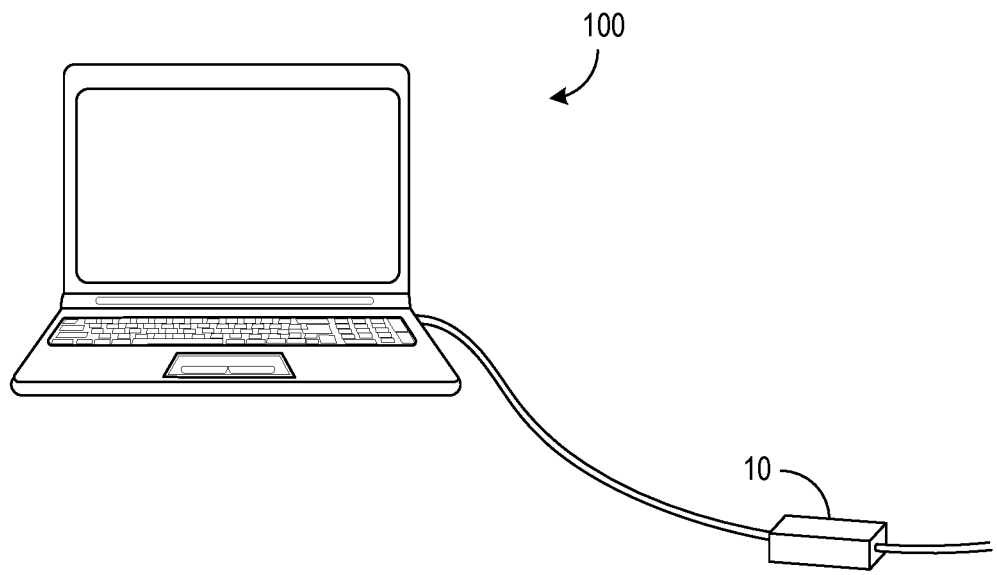

To address the issues discussed above, FIGS. 1A-B show illustrations of example electronic devices 100 equipped with a power supply 10 according to the present disclosure. FIG. 1A illustrates the electronic device 100 as a television having the power supply 10 installed internally as a board, for example, while FIG. 1B illustrates the electronic device 100 as a laptop computer having a power cord including the power supply 10 as an external device. Any type of electronic device usable with a power supply may be suitable as the electronic device 100, whether linear or switching, for large or small loads, industrial or residential, etc.

Figure 2:
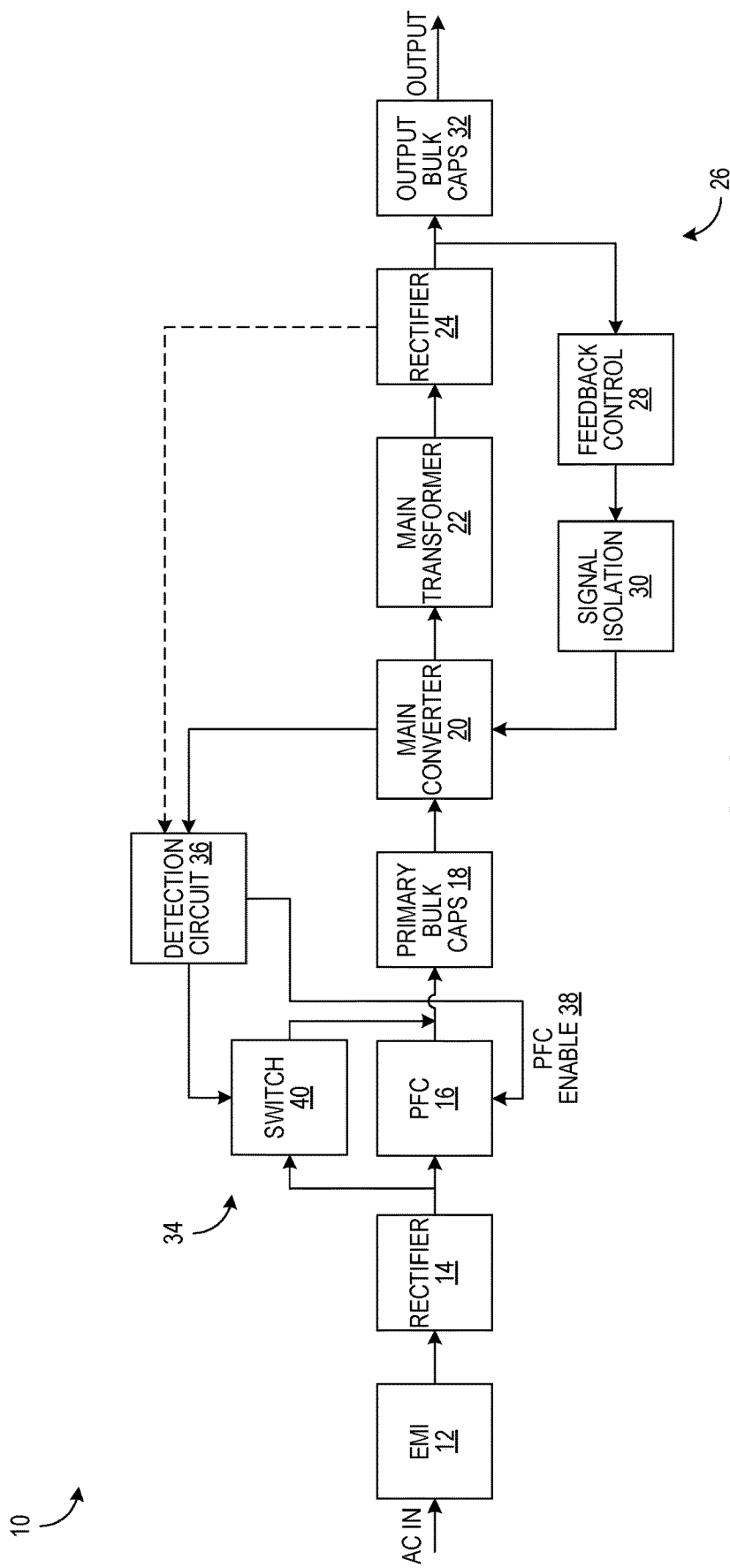
FIG. 2 shows a schematic view of the power supply according to one embodiment of the present disclosure.

FIG. 2 shows a schematic view of the power supply 10 according to one embodiment of the present disclosure. Some of the components of the power supply 10 may be modified, omitted, or substituted without departing from the scope of the present disclosure. The power supply 10 may be connected to a power source to receive an input current of electricity, shown as "AC IN." The power supply 10 may include an electromagnetic interference (EMI) filter 12 in order to suppress electromagnetic noise in the input current and also noise coming from a rectifier 14 downstream. The rectifier 14 may be configured to convert the electricity from alternating current (AC) to direct current (DC). Next, the power supply 10 may include a PFC circuit 16 configured to receive the input current from the power source, via the upstream components. When enabled, the PFC circuit 16 may be configured to reduce current harmonics in the input current by shaping the input sinusoidal current waveform to match the phase and shape of sinusoidal input voltage waveform. As discussed above, inducing current harmonics in the power source such as the mains power can cause structural damage and destabilize the power source, and PFC can be used to reduce these and other effects.

Continuing along the main flow path, the power supply 10 may include a primary bulk capacitor 18 configured to store energy and reduce ripple for voltage regulation. Next, the power supply 10 may include a main converter 20 configured to convert the current from DC to AC, then a main transformer 22 configured to step down the voltage of the AC current from the main converter 20. In one example, the main converter 20, main transformer 22, rectifier 24, and output bulk capacitor 32 together convert high voltage current from the primary side to a lower voltage current on the secondary side. It will be noted that the secondary output can be 5 V to 20 V for many consumer electronics applications. The main converter 20 functions by rapidly switching the primary voltage to create specific voltage and current waveforms which are further processed and smoothed to produce the desired output voltage. All of the components before the main transformer 22 may be considered the primary side, whereas the components after the main transformer 22 may be considered the secondary side. Following the main transformer 22, on the secondary side, an additional rectifier 24 may be configured to obtain or generate a DC voltage from the AC current output by the main transformer 22. The power supply 10 may include a feedback circuit 26 to compare an output load of the power supply 10 at the rectifier 24 to a reference load and correct operation of the main converter 20 based on the comparison. For example, the feedback circuit 26 may include a feedback control circuit 28 configured to modify the duty cycle of the main converter 20 followed by a signal isolation circuit 30 configured to isolate the primary side from the secondary side while still passing the feedback signal through. Finally, after the feedback circuit 26, the power supply 10 may include an output bulk capacitor 32 configured to store energy and reduce ripple for voltage regulation before the final output current is delivered to the associated electronic device 100.

The power supply 10 may include a PFC bypass circuit 34 configured to bypass the PFC circuit 16 when the PFC circuit 16 is disabled. In addition, the power supply 10 may include a detection circuit 36 configured to detect the output load of the power supply 10 and output a PFC enable command 38 based at least in part on the detected output load being greater than or equal to a threshold value (e.g., when the detected output load is greater than or equal to the threshold value). Accordingly, the power supply 10 may be able to perform PFC only under higher loads in order to meet regulatory standards. Thus, the threshold value may be preset such that the current harmonics of the power supply will not exceed a permissible harmonics level set by an applicable, predetermined standard when powering the electronic device 100 at a specified power level. For example, the applicable, predetermined standard may be IEEE standard 519-2014. Additionally or alternatively, the threshold value may be preset such that the current harmonics do not exceed levels set by CENELEC EN61000-3-2 (as specified in clause 7 and FIG. Z1 of EN 61000-3-2:2006). Other predetermined standards may be applicable based on location, device type, load rating, etc. Accordingly, the power supply 10 may be able to meet any specific standard without sacrificing efficiency. Similarly, the detection circuit 36 may be configured to send a PFC disable command in order to disable the PFC circuit 16 when the detected output load is less than the threshold value. As such, the PFC circuit will use less power with its components disabled, increasing the efficiency of the power supply 10 at output loads where the applicable current harmonic limits can be met without the use of PFC. It will be appreciated that in some implementations, the PFC enable command 38 may be received by a PFC controller to enable the PFC circuit 16 and the bypass circuit 34 will be disabled either automatically, by the same enable command 38, or by another signal. In others, the PFC enable command 38 may be received by the PFC bypass circuit 34 to stop bypassing the PFC circuit 16 and thereby automatically turn on (enable) the PFC circuit 16. For example, a passive PFC circuit may include an inductor that is shorted out when the bypass circuit 34 is enabled, turning the PFC circuit 16 off, and the PFC circuit 16 will automatically turn back on when the bypass circuit 34 is disabled and the short is removed. It is noted that the detection circuit 36 may detect the output load at the primary side, such as at the main converter 20, or at the secondary side, such as at the rectifier 24.

Figure 9:
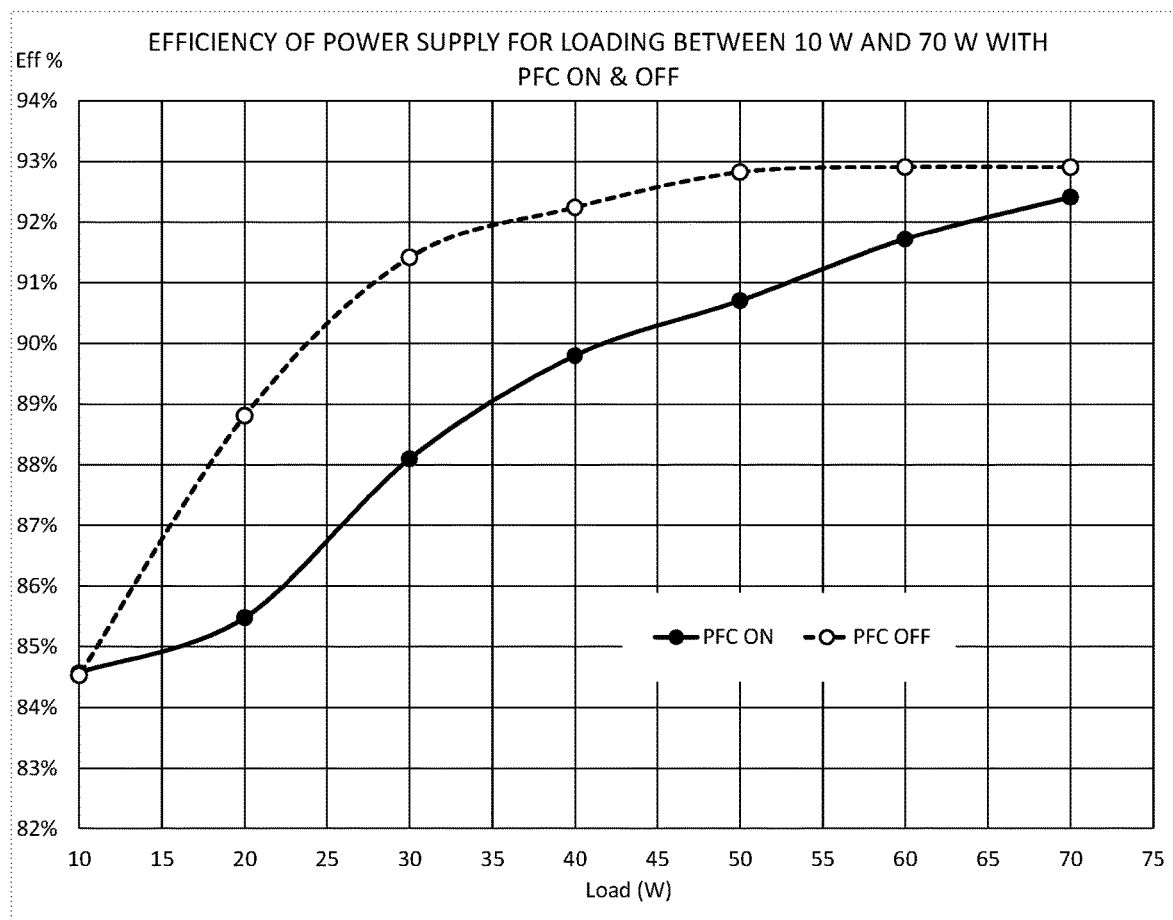
FIG. 9 shows a graph of power supply efficiency with PFC enabled vs. disabled.

The threshold value may be set to an appropriate point to see efficiency gains while still complying with regulations. In one example, the threshold value is set between 10-90 W. In this manner, the threshold value would be set above 10 W, which is approximately where the efficiencies of a power supply with PFC enabled and disabled switch and the PFC enabled power supply becomes more efficient, as shown in FIG. 9. In addition, setting the threshold below 90 W may keep the induced current harmonics substantially below regulated levels. In another example, the threshold value is set between 75-90 W. In this manner, the power supply 10 may experience increased gains in efficiency by keeping the PFC disabled when the load is under 75 W, and increased reliability in not exceeding allowable harmonics levels when the load is 90 W or greater. In another example, the threshold value is set to 87 W, which was determined to be a suitable trade-off point between safely passing regulatory testing and seeing maximum efficiency gains for one electronic device 100. However, it will be appreciated that different electronic devices 100 maybe suited to different threshold values, and therefore the power supply 10 and electronic device 100 may be tested to determine where the threshold value should be set for different products. In yet another example, the threshold value may be set at 75 W. This is because at least one regulatory body has decided that harmonic current emissions need not be regulated in devices with output loads less than 75 W.

In the embodiment of FIG. 2, the PFC bypass circuit 34 may include a switch 40 configured to be disabled by the detection circuit 36 when the detected output load is greater than or equal to the threshold value. With the switch 40, the detection circuit 36 may have a way to open or close the PFC bypass circuit 34 in a coordinated method with the enablement/disablement of the PFC circuit 16 and therefore keep the power supply 10 functioning even when the PFC circuit 16 is disabled. As some examples, the switch 40 may be implemented as a power MOSFET or other power transistor or relay. The switch 40 may be disabled by the same PFC enable command 38 or by a separate command. The embodiment including the switch 40 may be particularly suitable when the PFC circuit 16 is a passive PFC circuit, because an existing passive PFC circuit 16 does not include components easily formed into a bypass. However, the switch 40 may also be used when the PFC circuit 16 is an active PFC circuit, providing increased design flexibility. Regardless of the type of PFC circuit 16, the detection circuit 36 may configured as a microcontroller. For example, the detection circuit 36 may be an integrated circuit on a small chip containing a processor, memory, and an input/output (I/O) interface. A microcontroller may provide more complex programmable control, particularly of less complex PFC circuits 16 and bypass circuits 34. Alternatively, the detection circuit 36 may be an analog circuit, and therefore may be more physically adaptable during design. An analog circuit has the advantage of simpler manufacturing and lower cost, with sufficient functionality to implement bypass logic.

Figure 8:
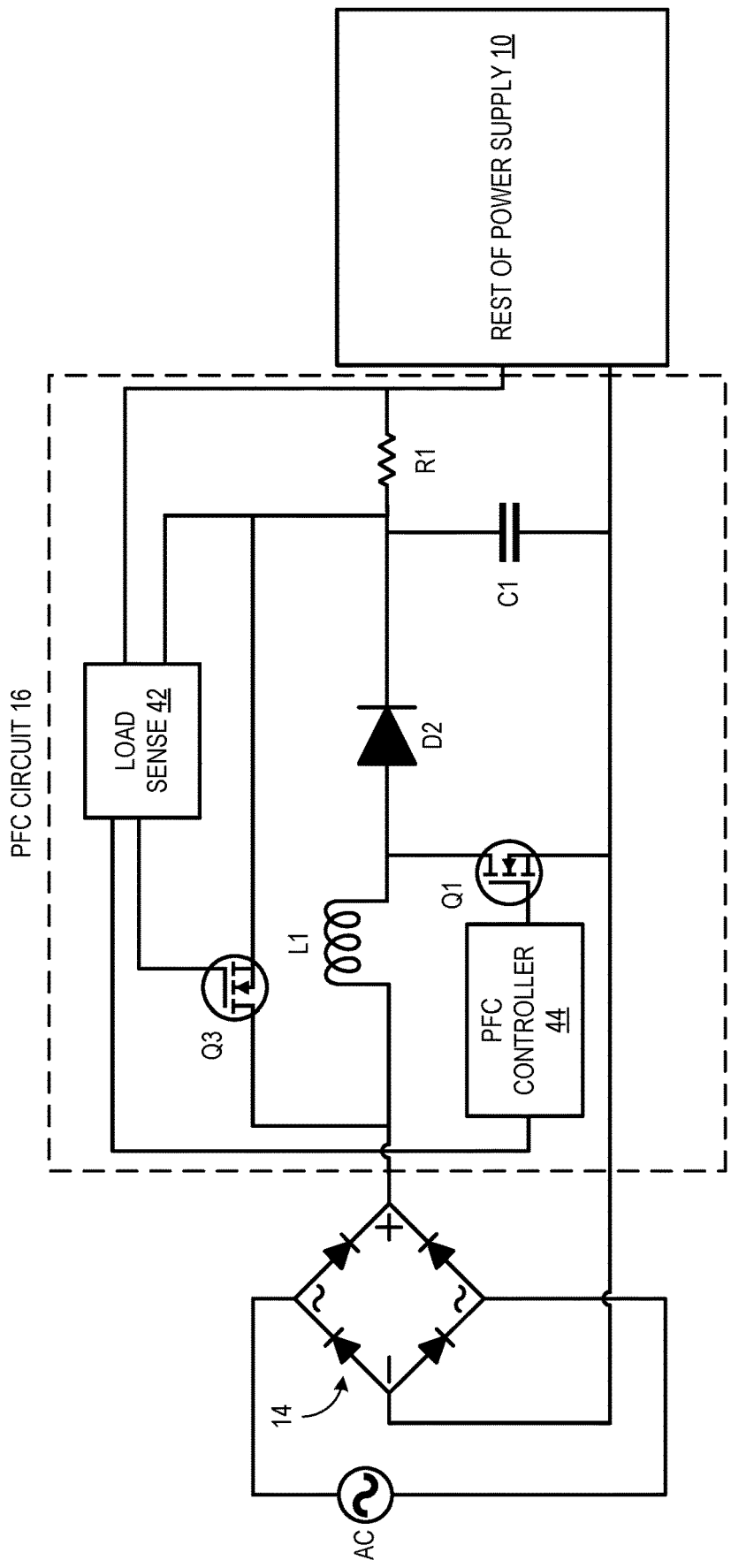
FIG. 8 shows a second circuit diagram according to an example of the present disclosure.

FIG. 8 shows a circuit diagram according to an example of the present disclosure that may correspond to the power supply 10 of FIG. 2, for the purpose of illustrating the details of the PFC circuit 16. The electrical elements depicted in this diagram are shown with standard symbols and have their usual functions. It will be appreciated that FIG. 8 merely shows one example circuit diagram and many modifications are possible. As illustrated, connected to the AC input current is the rectifier 14 leading to the PFC circuit 16, followed by the rest of the power supply 10 (consolidated for simplicity). In series from the AC input current are an inductor L1, a diode D2, and a resistor R1. In parallel to the inductor L1 and diode D2 is a MOSFET transistor Q3, the gate terminal of which is connected to a load sense 42 (part of detection circuit 36) and the source terminal of which is connected between the diode D2 and the resistor R1. The transistor Q3 may embody switch 40. Another MOSFET transistor Q1 is connected between the inductor L1 and the diode D2 and is operated by a PFC controller 44 to actively switch while the PFC circuit 16 is enabled and is turned off when the PFC circuit 16 is disabled. A capacitor C1 is provided between the diode D2 and the resistor R1.

Figure 3:
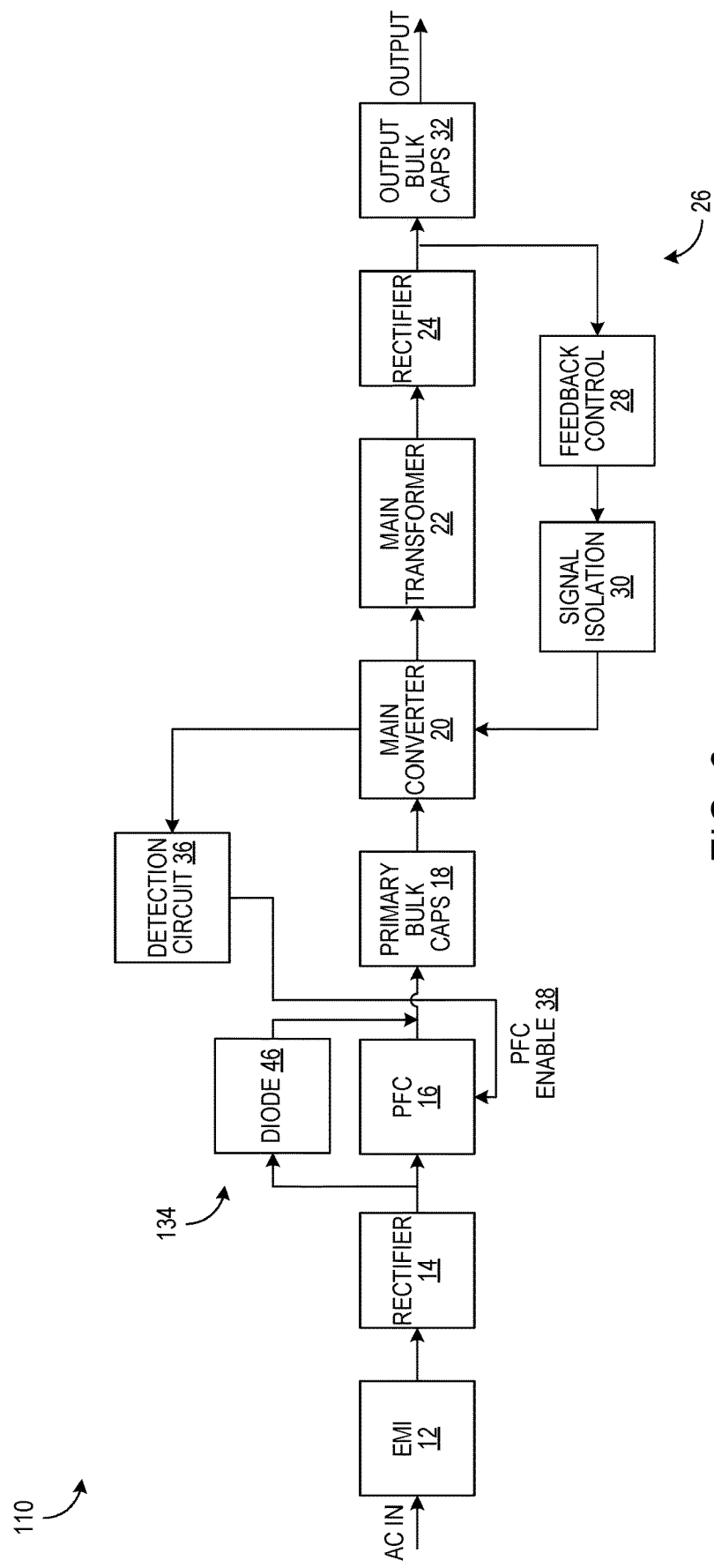
FIG. 3 shows a schematic view of the power supply according to another embodiment of the present disclosure.
Figure 5:
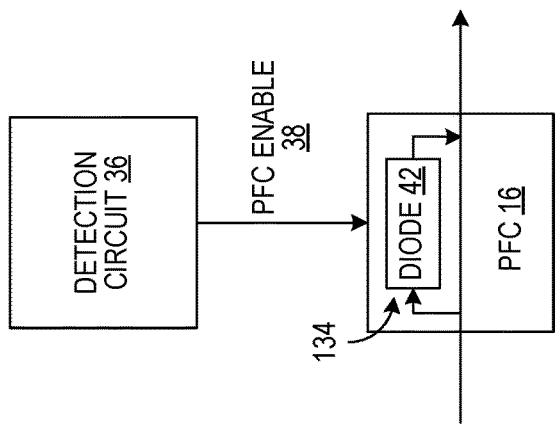
FIG. 5 shows a schematic view of an example PFC of the power supply of FIG. 3 utilizing an internal diode.

Turning to FIG. 3, another embodiment of the power supply is illustrated as power supply 110. Power supply 110 includes many of the same components as the power supply 10 and therefore redundant explanation of like-numbered components will be omitted. Rather than the switch 40, PFC bypass circuit 134 may include a diode 46 that is reversed biased when the PFC circuit 16 is enabled. Compared to a switch, a diode is relatively simple but less efficient and therefore may be used to lower cost. The PFC circuit 16 may be an active PFC circuit, because the diode 46 output voltage may not always be lower than its input voltage when a passive PFC circuit is enabled, which would allow part of the current to flow through the diode 46 and bypass the passive PFC circuit. Thus, by adopting an appropriate one of the embodiments disclosed herein, either an active or passive PFC circuit can be modified according to the present disclosure. Technical advantages of using active PFC include that it can work with a wide range of input voltages, such as those found in the mains power grids of countries around the world, and it can be used to achieve high power factors using small, light, and inductive components. Technical advantages of using passive PFC include that the overall cost and complexity of the circuit can be reduced, and lower voltage components may be used. In this case, as shown in FIG. 5, the PFC bypass circuit 134 may be a component of the PFC circuit 16 and may be configured to bypass the PFC circuit 16 by conducting current through a portion of the PFC circuit 16 without PFC being performed. Thus, the diode 46 may already be a component of a typical active PFC circuit used in startup and surge protection that can be enabled or disabled by virtue of the input voltage being greater than the output voltage (e.g., such as when the active PFC is turned off), and thus in this example, adding an additional component to the PFC circuit 16 to form a bypass is not necessary, simplifying manufacture and lowering cost. Alternatively, the diode 46 may be an additional component outside of the PFC circuit 16. As with the switch 40, the diode 46 may be enabled (forward biased) when the PFC circuit 16 is disabled, forming the PFC bypass circuit 134, and disabled (reverse biased) when the PFC circuit 16 is enabled, forcing the electric flow to be subjected to PFC without bypassing.

Figure 7:
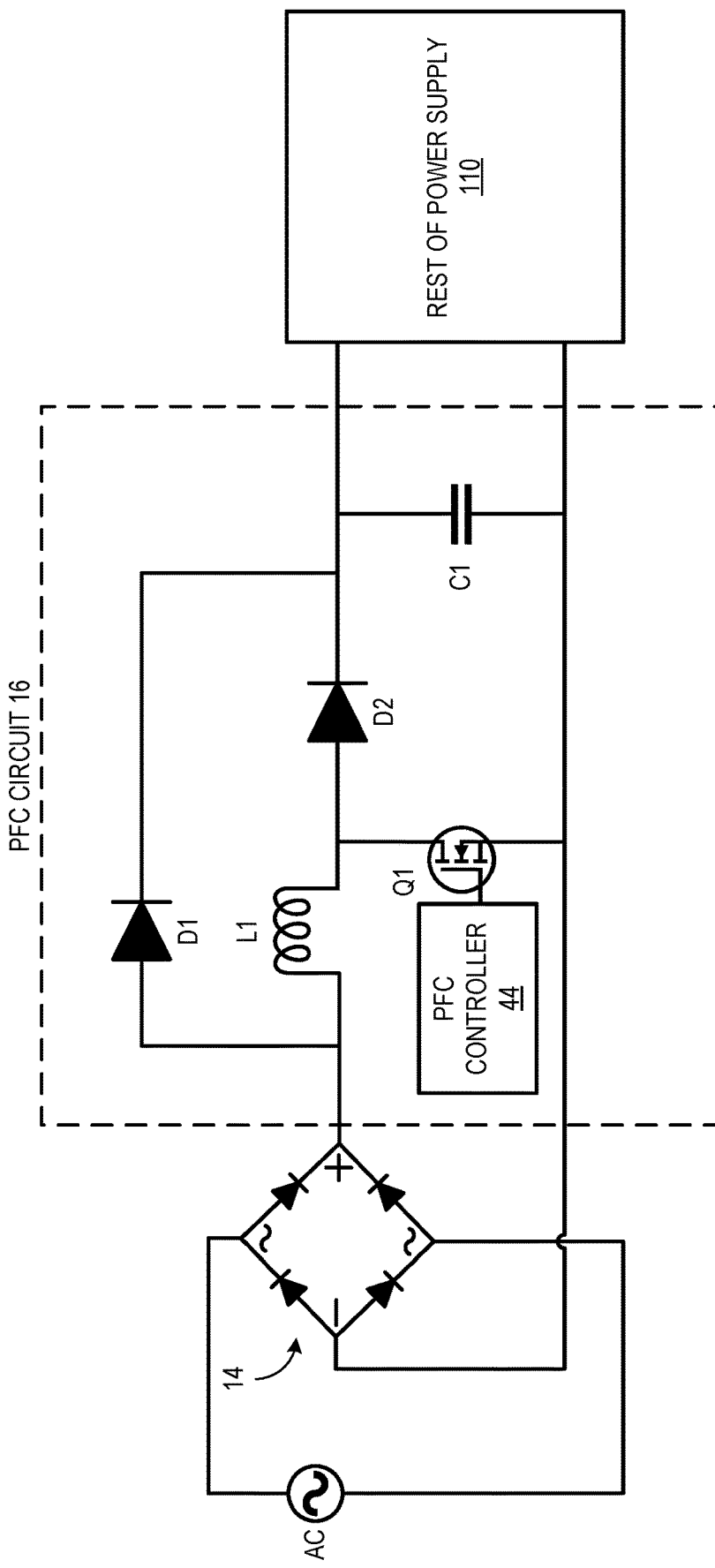
FIG. 7 shows a first circuit diagram according to an example of the present disclosure.

Similar to FIG. 8, FIG. 7 shows a circuit diagram according to an example of the present disclosure that may correspond to the power supply 110 of FIG. 3, for the purpose of illustrating the details of the PFC circuit 16. The electrical elements depicted in this diagram are shown with standard symbols and have their usual functions. It will be appreciated that FIG. 7 merely shows one example circuit diagram and many modifications are possible. As illustrated, connected to the AC input current is the rectifier 14 leading to the PFC circuit 16, which is an active PFC circuit, followed by the rest of the power supply 110 (consolidated for simplicity). In series from the AC input current are the inductor L1 and the diode D2, but not the resistor R1 that is included in FIG. 8. In parallel to the inductor L1 and diode D2 is a diode D1 which embodies diode 46. The MOSFET transistor Q1 is connected between the inductor L1 and the diode D2 and is operated by the PFC controller 44 to actively switch while the PFC circuit 16 is enabled and is turned off when the PFC circuit 16 is disabled. The capacitor C1 is provided after the diode D2.

Figure 6:
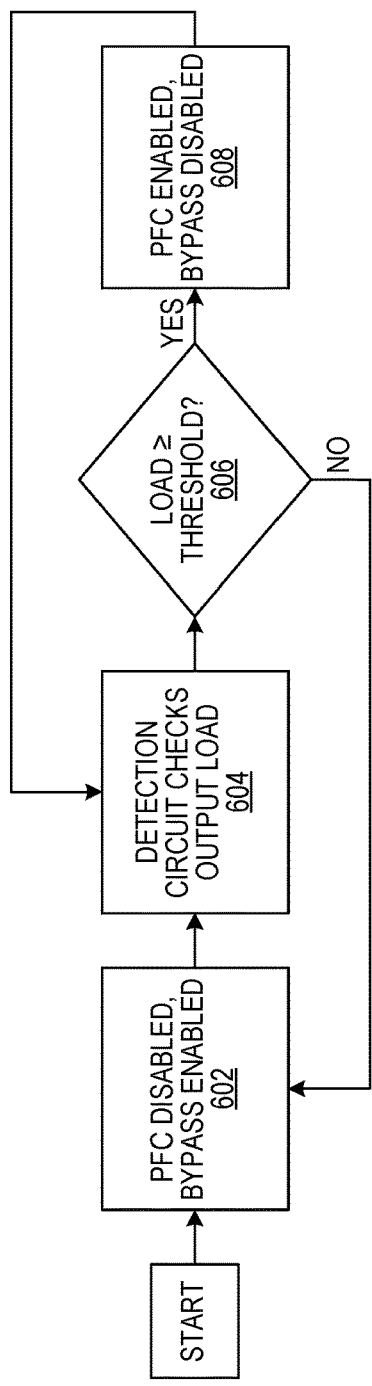
FIG. 6 shows a logic flowchart of operation of the power supplies of FIGS. 2 and 3.

Any disclosed embodiment of the power supply 10, 110 may be configured to operate according to the basic logic flowchart of FIG. 6. At 602, the PFC circuit 16 may already be disabled while the PFC bypass circuit 34, 134 may already be enabled. The beginning enablement status is arbitrary and may be reversed. At 604, the detection circuit 36 may be configured to check the output load. If the output load is greater than or equal to the threshold (YES at 606), then the logic proceeds to 608. If the output load is less than the threshold (NO at 606), then the logic returns to 602 where the PFC circuit 16 is disabled while the PFC bypass circuit 34, 134 is enabled. At 608, the PFC circuit 16 is enabled, and the PFC bypass circuit 34, 134 is disabled.

Figure 4:
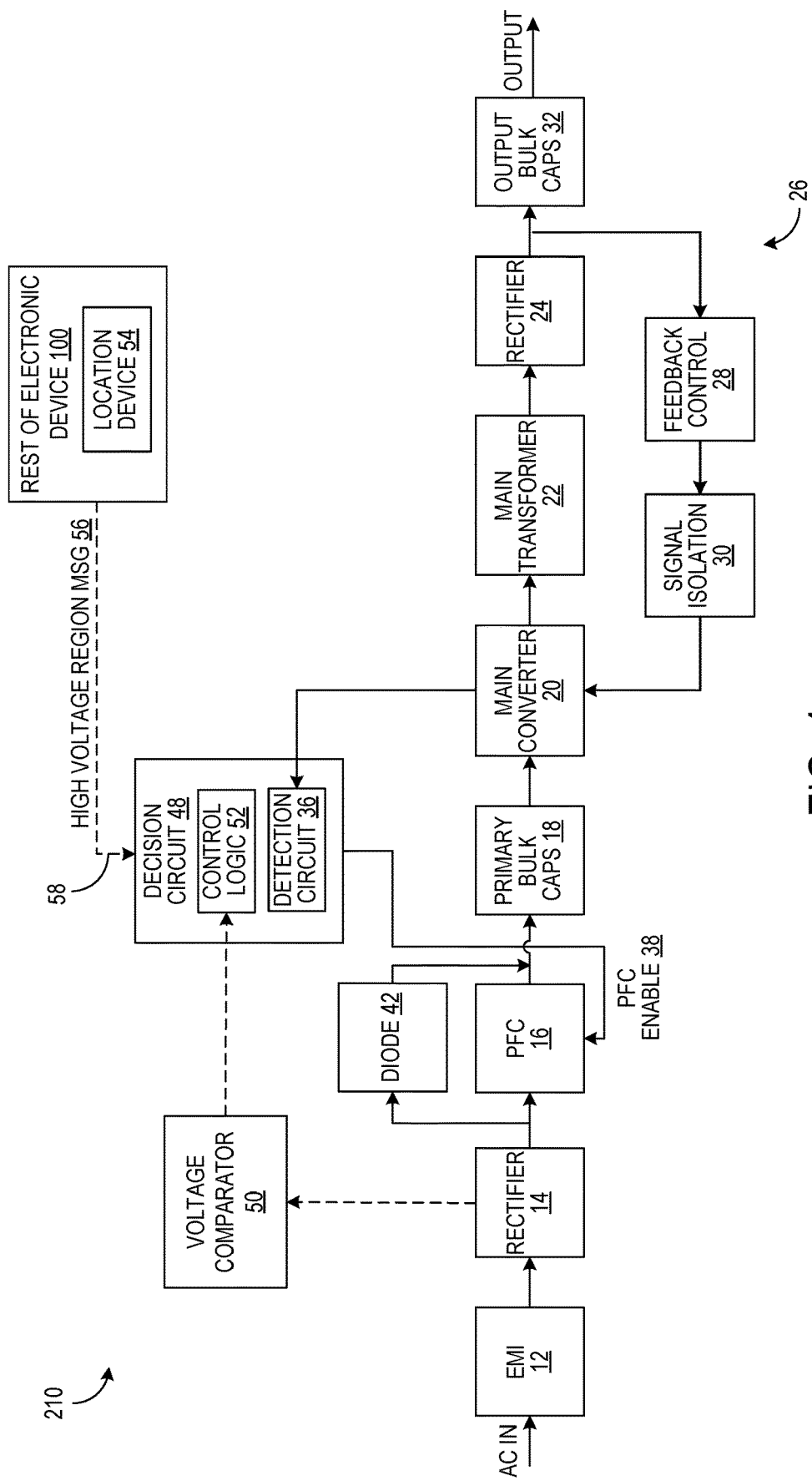
FIG. 4 shows a schematic view of the power supply according to another embodiment of the present disclosure.

FIG. 4 shows a region-aware modified implementation of a power supply 210. It will be appreciated that the illustrated modification is applied to the power supply 110 having the diode 46 as a base, but the same modification may be applied to the power supply 10 instead. In the power supply 210, the PFC circuit may be selectively enabled based in part on inferring that the electronic device 100 is currently located in a high voltage region, since high voltage regions generally have regulations requiring use of PFC to limit current harmonics, while many low voltage regions do not. Most high voltage regions have residential voltages supplied at 220 V, 230 V, or 240 V. In one implementation, a region having a residential voltage of 200 V or greater is a high voltage region.

In the power supply 210, a decision circuit 48 may include the detection circuit 36, where the decision circuit 48 is configured to output the PFC enable command 38 based at least in part on the detected output load being greater than or equal to a threshold value and a determination that an input voltage of the power source is greater than or equal to a threshold value. One option for obtaining information about the input voltage for making this determination is including a voltage comparator 50 configured to measure a voltage upstream of the PFC circuit 16, compare the measured voltage to the threshold value, and output to the decision circuit 48 the determination that the input voltage of the power source is greater than or equal to the threshold value. The decision circuit 48 may include control logic 52 to process the determination and output the PFC enable command 38 or refrain from outputting the command. In this manner, a simple circuit-based configuration may be used to determine the input voltage and then the power supply 210 may be operated in compliance with applicable regulations without sacrificing efficiency. Furthermore, even if the electronic device 100 is a simple device having no communication features with external devices, then the voltage comparator 50 may provide a way for the input voltage to be known to the power supply 210. It will be appreciated that the voltage comparator 50 may measure the input voltage directly, but may also instead measure the voltage at a later stage of the power supply 210 such as after the rectifier 14 as illustrated, and therefore the actual threshold value used in the comparison may be calculated based on changes that the voltage has gone through thus far through the circuitry of the power supply 210. In the depicted example, an input voltage of 220 V may be approximately 280 V to 342 V (assuming approximately 10% tolerance) after the rectifier 14 and therefore the threshold value may be set at approximately 250 V to determine if the electronic device 100 is in a high voltage region, even taking into account varying residential voltages between high voltage regions. However, some outliers regions may benefit from adjustment to this value. In addition, other appropriate values may be calculated based on differing circuit designs so that the detected voltage at the threshold corresponds to the input voltage of a high voltage region.

In addition or alternatively to including the voltage comparator 50, the electronic device 100 powered by the power supply 210 may include a location device 54 such as a global positioning system (GPS) receiver, a wireless internet connection, or any other suitable hardware for determining the location of the electronic device 100. The electronic device 100 may be configured to send a high voltage region message 56 to the decision circuit 48 when the electronic device 100 is located in a high voltage region. Many complex devices such as laptops, tablets, and smartphones typically gather location information for other reasons and already have this information readily accessible, and therefore additional circuitry such as the voltage comparator 50 may be omitted, decreasing manufacturing cost and labor. In this case, the high voltage region message 56 may be communicated via communication line 58 such as a simple wire or a data channel such as a Universal Serial Bus (USB) connection. In some implementations, the high voltage region message 56 may include more specific information such as a particular country with atypical regulations that may be used to direct the decision circuit 48 in issuing the PFC enable command 38. For example, the electronic device 100 may be located in a country with more stringent regulations and therefore the PFC circuit 38 may be enabled at a lower threshold value than other countries at the same residential voltage. In another example, the applicable regulations may have exemptions for certain types of devices or load ratings and the high voltage region message 56 may inform the decision circuit that the PFC circuit 16 need not be enabled at all in the current location. The electronic device 100 may command the decision circuit 48 based on regional circumstances, or the electronic device 100 may pass the region information on to the decision circuit 48 and the control logic 52 may be configured to determine the appropriate timing and use of the PFC circuit 38 based on the current region.

For either implementation, the decision circuit 48 may be configured to operate the detection circuit 36 as discussed above to enable the PFC circuit 16, but override this decision when the electronic device 100 is in a low voltage region such as the United States so that the PFC circuit 16 is not enabled at all. Meanwhile, when the electronic device 100 is located in a high voltage region, then the process described above with reference to FIG. 6 may be performed. In some implementations, the decision circuit 48 may be configured to output the PFC enable command 38 based at least in part on the determination that the input voltage of the power source is greater than or equal to the threshold value, and refrain from outputting the PFC enable command 38 based at least in part on the input voltage being less than the threshold value, without including the detection circuit to detect the output load. This may provide a simpler solution to ensure regulations are followed with fewer components added to the power supply 210.

Figure 10:
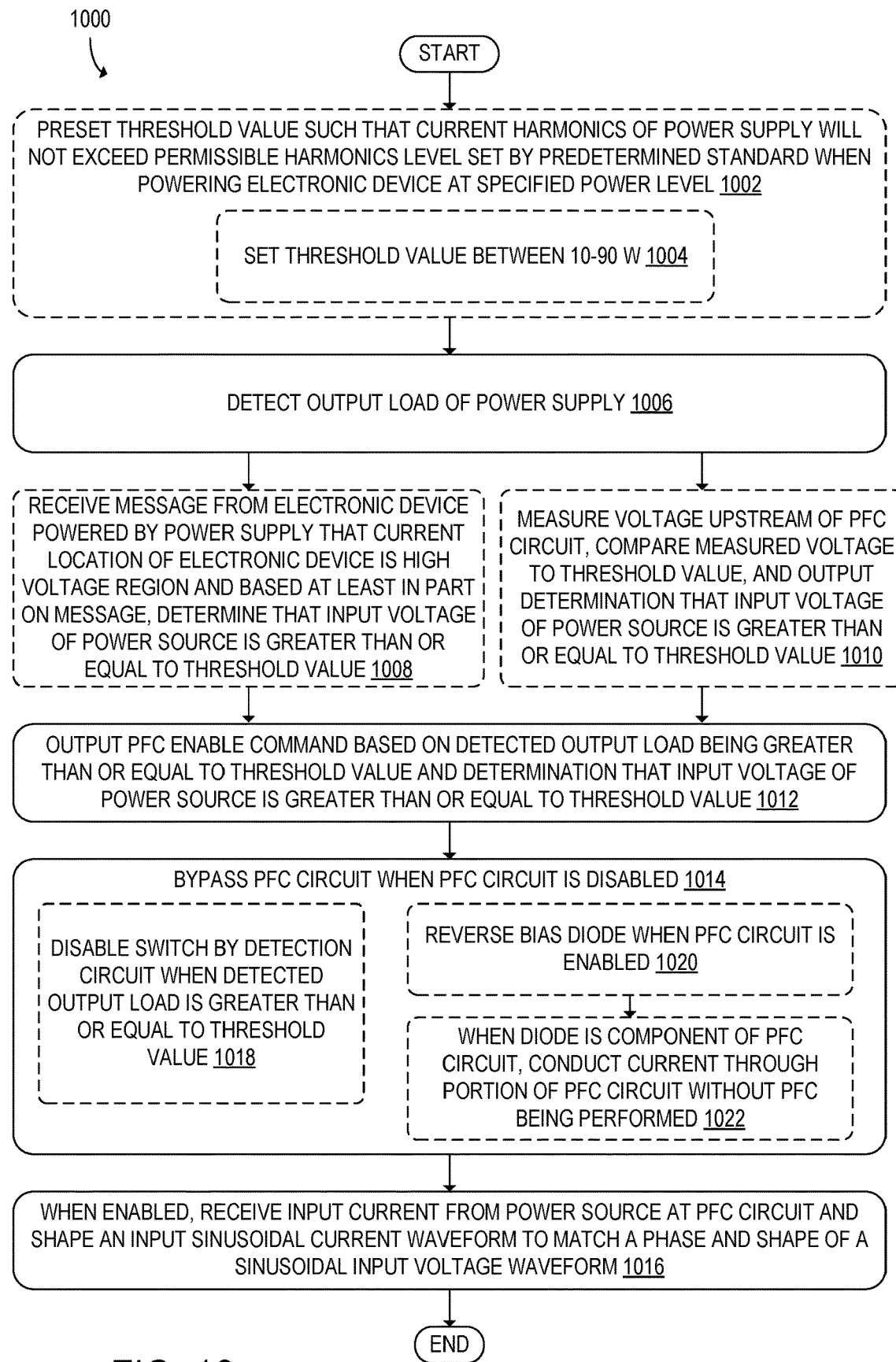
FIG. 10 shows a flowchart of an example method for selectively reducing current harmonics in an input current in a power supply.

FIG. 10 shows a flowchart of an example method 1000 for selectively reducing current harmonics in an input current in a power supply. The method 1000 may be implemented by the power supply 10, 110 illustrated in FIGS. 2 and 3. At 1002, the method 1000 may optionally include presetting a threshold value such that the current harmonics of the power supply will not exceed a permissible harmonics level set by an applicable standard when powering an electronic device at a specified power level. Accordingly, the power supply may be able to meet this specific standard without sacrificing efficiency. At 1004, the method 1000 may optionally include setting the threshold value between 10-90 W. In this manner, the power supply 10 may experience increased gains in efficiency by keeping the PFC disabled when the load is under 10 W, and improved AC power quality by not exceeding allowable harmonics levels when the load is 90 W or greater. Other suitable threshold values may be used for individual power supplies and applicable standards.

At 1006, the method 1000 may include detecting an output load of the power supply. At 1008, the method 1000 may include receiving a message from an electronic device powered by the power supply that a current location of the electronic device is a high voltage region and based at least in part on the message, determining that the input voltage of the power source is greater than or equal to the threshold value. Alternatively, at 1010, the method 1000 may include measuring a voltage upstream of the PFC circuit, comparing the measured voltage to the threshold value, and outputting the determination that the input voltage of the power source is greater than or equal to the threshold value. In this manner, a location that is likely already determined by the electronic device may be utilized, or a simpler configuration may be adopted to reduce a manufacturing and cost burden. At 1012, the method 1000 may include outputting a PFC enable command when the detected output load is greater than or equal to the threshold value and a determination that the input voltage of the power source is greater than or equal to the threshold value. At 1014, the method 1000 may include bypassing a PFC circuit when the PFC circuit is disabled. At 1016, the method 1000 may include, when enabled, receiving the input current from a power source at the PFC circuit and shaping an input sinusoidal current waveform to match a phase and shape of a sinusoidal input voltage waveform. As discussed above, inducing current harmonics in the power source such as the mains power can cause structural damage and destabilize the power source, and PFC can be used to reduce these and other effects. Further, bypassing the PFC circuit can increase the efficiency of the power supply.

At 1018, the bypassing may optionally comprise disabling a switch when the detected output load is greater than or equal to the threshold value. Alternatively, at 1020, the bypassing may optionally comprise reverse biasing a diode when the PFC circuit is enabled. A switch can be used, for example, to add dynamic switching functionality to the PFC circuit when the PFC circuit is a passive PFC circuit, while the diode may be used in a simple design leveraging preexisting components of an active PFC circuit. In one example, at 1022, the diode is a component of the PFC circuit, and the bypassing comprises conducting current through a portion of the PFC circuit without PFC being performed. Thus, the diode may already be a component of a typical active PFC circuit that can be enabled or disabled by the PFC enable command, causing the diode to then be enabled or disabled automatically by being forward and reversed biased without adding an additional component to the PFC circuit, in some cases. In some implementations, the PFC circuit may be an active PFC circuit, and therefore both active and passive PFC circuits are able to be adapted according to appropriate embodiments of the present disclosure to have dynamically controlled PFC in a power supply. In some implementations, the output load may be detected by a microcontroller. A microcontroller may provide more complex programmable control, particularly of less complex PFC circuits and bypass circuits. Alternatively, the detection circuit may be an analog circuit, and therefore may be more physically adaptable during design.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
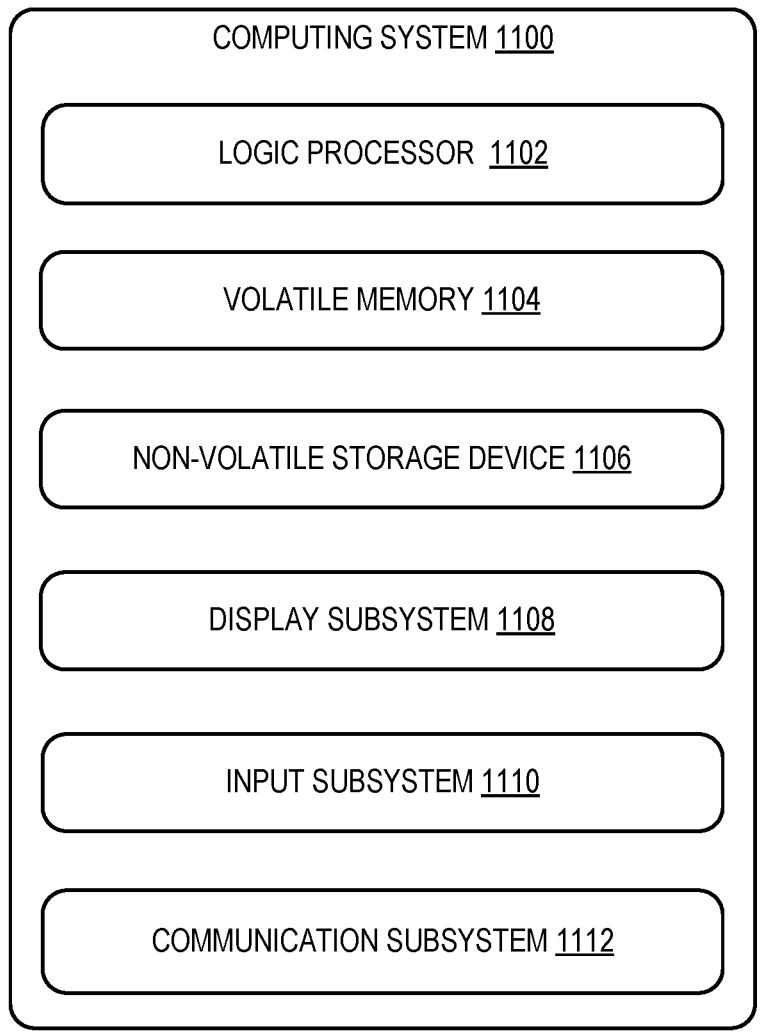
FIG. 11 shows a schematic view of an example computing environment in which the power supply of FIGS. 2 and 3 may be included.

FIG. 11 schematically shows a non-limiting embodiment of a computing system 1100 that can enact one or more of the methods and processes described above. Computing system 1100 is shown in simplified form. Computing system 1100 may embody the electronic device 100 described above and illustrated in FIGS. 1A and 1B. Computing system 1100 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 1100 includes a logic processor 1102 volatile memory 1104, and a non-volatile storage device 1106. Computing system 1100 may optionally include a display subsystem 1108, input subsystem 1110, communication subsystem 1112, and/or other components not shown in FIG. 11.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built-in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, or game controller. When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

The following paragraphs provide additional support for the claims of the subject application. One aspect provides a power supply, comprising a power factor correction (PFC) circuit configured to receive an input current from a power source and, when enabled, reduce current harmonics in the input current by shaping an input sinusoidal current waveform to match a phase and shape of a sinusoidal input voltage waveform, a PFC bypass circuit configured to bypass the PFC circuit when the PFC circuit is disabled, and a decision circuit including a detection circuit configured to detect an output load of the power supply, the decision circuit configured to output a PFC enable command based at least in part on the detected output load being greater than or equal to a threshold value and a determination that an input voltage of the power source is greater than or equal to a threshold value. In this aspect, additionally or alternatively, the threshold value may be preset such that the current harmonics of the power supply will not exceed a permissible harmonics level set by an applicable standard when powering an electronic device at a specified power level. In this aspect, additionally or alternatively, the PFC bypass circuit may include a switch configured to be disabled by the detection circuit based at least in part on the detected output load being greater than or equal to the threshold value. In this aspect, additionally or alternatively, In this aspect, additionally or alternatively, the PFC circuit may be a passive PFC circuit. In this aspect, additionally or alternatively, the PFC bypass circuit may include a diode that is reversed biased when the PFC circuit is enabled. In this aspect, additionally or alternatively, the PFC circuit may be an active PFC circuit. In this aspect, additionally or alternatively, the decision circuit may be configured to receive a message from an electronic device powered by the power supply that a current location of the electronic device is a high voltage region and based at least in part on the message, determine that the input voltage of the power source is greater than or equal to the threshold value. In this aspect, additionally or alternatively, the power supply may further comprise a voltage comparator configured to measure a voltage upstream of the PFC circuit, compare the measured voltage to the threshold value, and output to the decision circuit the determination that the input voltage of the power source is greater than or equal to the threshold value. In this aspect, additionally or alternatively, the detection circuit may be configured as a microcontroller. In this aspect, additionally or alternatively, the detection circuit may be an analog circuit.

Another aspect provides a method for selectively reducing current harmonics in an input current in a power supply. The method may comprise detecting an output load of the power supply, outputting a power factor correction (PFC) enable command based at least in part on the detected output load being greater than or equal to a threshold value and a determination that an input voltage of the power source is greater than or equal to a threshold value, bypassing a PFC circuit when the PFC circuit is disabled, and when enabled, receiving the input current from a power source at the PFC circuit and shaping an input sinusoidal current waveform to match a phase and shape of a sinusoidal input voltage waveform. In this aspect, additionally or alternatively, the method may include presetting the threshold value such that the current harmonics of the power supply will not exceed a permissible harmonics level set by an applicable standard when powering an electronic device at a specified power level. In this aspect, additionally or alternatively, the bypassing may comprise disabling a switch based at least in part on the detected output load being greater than or equal to the threshold value. In this aspect, additionally or alternatively, the PFC circuit may be a passive PFC circuit. In this aspect, additionally or alternatively, the bypassing may comprise reverse biasing a diode when the PFC circuit is enabled. In this aspect, additionally or alternatively, the PFC circuit may be an active PFC circuit. In this aspect, additionally or alternatively, the method may further comprise receiving a message from an electronic device powered by the power supply that a current location of the electronic device is a high voltage region and based at least in part on the message, determining that the input voltage of the power source is greater than or equal to the threshold value. In this aspect, additionally or alternatively, the method may further comprise measuring a voltage upstream of the PFC circuit, comparing the measured voltage to the threshold value, and outputting the determination that the input voltage of the power source is greater than or equal to the threshold value. In this aspect, additionally or alternatively, the output load may be detected by a microcontroller.

Another aspect provides a switching-mode power supply, comprising a power factor correction (PFC) circuit configured to receive an input current from a power source and, when enabled, reduce current harmonics in the input current by shaping an input sinusoidal current waveform to match a phase and shape of a sinusoidal input voltage waveform, a PFC bypass circuit configured to bypass the PFC circuit when the PFC circuit is disabled, and a decision circuit configured to output a PFC enable command based at least in part on a determination that an input voltage of the power source is greater than or equal to a threshold value, and refrain from outputting the PFC enable command based at least in part on the input voltage being less than the threshold value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A power supply, comprising:
   a power factor correction (PFC) circuit configured to receive an input current from a power source and, when enabled, reduce current harmonics in the input current by shaping an input sinusoidal current waveform to match a phase and shape of a sinusoidal input voltage waveform;
   a PFC bypass circuit configured to bypass the PFC circuit when the PFC circuit is disabled; and
   a decision circuit including a detection circuit configured to detect an output load of the power supply, the decision circuit configured to output a PFC enable command based at least in part on the detected output load being greater than or equal to a threshold value and a determination that an input voltage of the power source is greater than or equal to a threshold value.

2. The power supply of claim 1, wherein the threshold value is preset such that the current harmonics of the power supply will not exceed a permissible harmonics level set by a predetermined standard when powering an electronic device at a specified power level.

3. The power supply of claim 1, wherein the PFC bypass circuit includes a switch configured to be disabled by the detection circuit based at least in part on the detected output load being greater than or equal to the threshold value.

4. The power supply of claim 3, wherein the PFC circuit is a passive PFC circuit.

5. The power supply of claim 1, wherein the PFC bypass circuit includes a diode that is reversed biased when the PFC circuit is enabled.

6. The power supply of claim 5, wherein the PFC circuit is an active PFC circuit.

7. The power supply of claim 1, wherein the decision circuit is configured to receive a message from an electronic device powered by the power supply that a current location of the electronic device is a high voltage region and based at least in part on the message, determine that the input voltage of the power source is greater than or equal to the threshold value.

8. The power supply of claim 1, further comprising a voltage comparator configured to measure a voltage upstream of the PFC circuit, compare the measured voltage to the threshold value, and output to the decision circuit the determination that the input voltage of the power source is greater than or equal to the threshold value.

9. The power supply of claim 1, wherein the detection circuit is configured as a microcontroller.

10. The power supply of claim 1, wherein the detection circuit is an analog circuit.

11. A method for selectively reducing current harmonics in an input current in a power supply, comprising:
    detecting an output load of the power supply;
    outputting a power factor correction (PFC) enable command based at least in part on the detected output load being greater than or equal to a threshold value and a determination that an input voltage of the power source is greater than or equal to a threshold value;
    bypassing a PFC circuit when the PFC circuit is disabled; and
    when enabled, receiving the input current from a power source at the PFC circuit and shaping an input sinusoidal current waveform to match a phase and shape of a sinusoidal input voltage waveform.

12. The method of claim 11, further comprising presetting the threshold value such that the current harmonics of the power supply will not exceed a permissible harmonics level set by a predetermined standard when powering an electronic device at a specified power level.

13. The method of claim 11, wherein the bypassing comprises disabling a switch based at least in part on the detected output load being greater than or equal to the threshold value.

14. The method of claim 13, wherein the PFC circuit is a passive PFC circuit.

15. The method of claim 11, wherein the bypassing comprises reverse biasing a diode when the PFC circuit is enabled.

16. The method of claim 15, wherein the PFC circuit is an active PFC circuit.

17. The method of claim 11, further comprising receiving a message from an electronic device powered by the power supply that a current location of the electronic device is a high voltage region and based at least in part on the message, determining that the input voltage of the power source is greater than or equal to the threshold value.

18. The method of claim 11, further comprising measuring a voltage upstream of the PFC circuit, comparing the measured voltage to the threshold value, and outputting the determination that the input voltage of the power source is greater than or equal to the threshold value.

19. The method of claim 11, wherein the output load is detected by a microcontroller.

20. A switching-mode power supply, comprising:
    a power factor correction (PFC) circuit configured to receive an input current from a power source and, when enabled, reduce current harmonics in the input current by shaping an input sinusoidal current waveform to match a phase and shape of a sinusoidal input voltage waveform;
    a PFC bypass circuit configured to bypass the PFC circuit when the PFC circuit is disabled; and
    a decision circuit configured to output a PFC enable command based at least in part on a determination that an input voltage of the power source is greater than or equal to a threshold value, and refrain from outputting the PFC enable command based at least in part on the input voltage being less than the threshold value.

* * * * *